Figure 1:
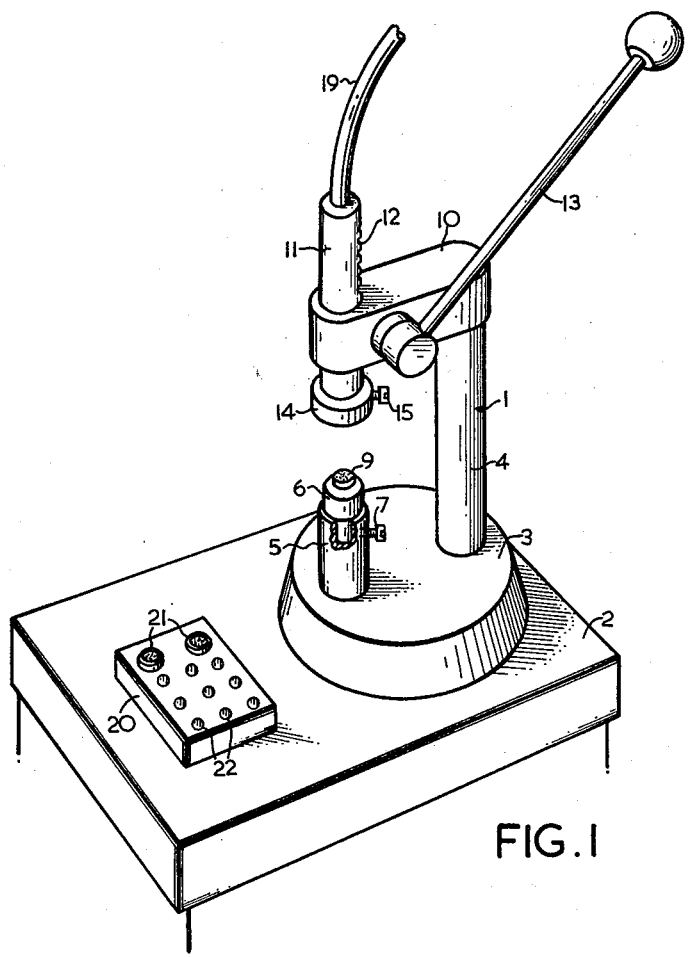

May 18, 1965   P. F. THOMAS   3,183,637
MANUFACTURE OF CORNEAL LENSES
Filed Oct. 29, 1962

– – –

3,183,637
MANUFACTURE OF CORNEAL LENSES
Penrhyn Francis Thomas, Sydney, New South Wales, Australia, assignor to Corneal Lens Corporation Pty. Limited, Sydney, New South Wales, Australia, a company of Australia
Filed Oct. 29, 1962, Ser. No. 233,716
2 Claims. (Cl. 51—284)

The invention relates to the manufacture of contact lenses placed on the cornea of the human eye to provide a practically invisible correction of the eye sight, and more specifically to the mounting of such lenses on a lens support for further processing.

Such contact lenses hereinafter referred to as corneal lenses are manufactured from glass or plastic rods of circular diameter by cutting off a blank of suitable thickness and fixing it by wax or a similar easily meltable compound to a support for grinding. The free side of the blank is then ground concave to the proper curve required to give the wanted correction of the eye sight. As the cornea on which the finished lens is placed is not completely spherical it is necessary to grind additional flatter secondary curves on the outer part of the lens where they do not interfere with the vision. These secondary curves are ground with the blank still affixed to the support as mentioned above.

Thereafter the blank is removed from the support and is placed by means of wax to another support with the ground concave side facing the wax, and the flat side of the blank is then convex shaped by grinding to give the lens its final form or power. By softening the wax through application of heat the finished lens can then be removed from the support.

The above described manufacturing process has the disadvantage that it is not possible to manufacture contact lenses for stock as the secondary curves have to be varied considerably to fit individual corneas and thus lenses of the same power would have to be manufactured with a great variety of secondary curves making it uneconomical to stock them.

Attempts have, therefore, been made to grind the secondary curves on to the lens at a later stage and only prepare the main curve for the required power in the first two grinding steps. These attempts have, however, been unsuccessful owing to the very delicate nature of the lens. Once the lens is ground and is then manually pressed into the wax for grinding of the secondary curves distortions of the very thin lens occur which ruin the lens. The same difficulties can, to a certain extent, occur also, when the partly ground blank is reversed for final grinding as mentioned above.

The beforementioned difficulties are overcome according to the invention by placing the blank or the lens in a lens holder without exerting pressure thereon, aligning a lens support with the lens holder, covering the face of the lens support with a mounting compound, bringing the lens support into close proximity with the lens holder and applying air pressure to the surface of the lens on the side opposite to the lens support to blow the lens on to the support.

By this method the pressing force is applied evenly over the whole surface of the lens. Distortion of the lens can be completely prevented and it is thus possible to stock lenses of various powers and to grind the secondary curves later on as required for the individual cornea of the wearer.

If, for example, the secondary curves are to be ground after the lens has been ground on both sides for a predetermined power the lens is placed with its concave side facing outwardly into the hollow end of a lens holder vertically movably arranged above the support which is designed to support the lens for grinding. The hollow end of the lens holder has an internal diameter substantially the same as the outside diameter of the lens so that the edges of the latter is held therein by adhesion without exerting any pressure which would distort the lens.

The lens holder has a central bore connectable with a source of air pressure. The lens holder and the lens support, to which the lens is to be fixed are made of heat conducting material and are mounted on a heatable plate to maintain the wax or compound of low melting point in a softened state.

Figure 2:
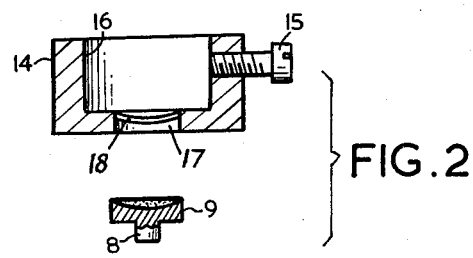

One embodiment of the invention is described hereinafter in connection with the drawings in which FIG. 1 shows a perspective view of the mounting apparatus according to the invention;

FIG. 2 shows an enlarged section of the lens holding socket and the lens support to which the lens is to be fixed.

In FIG. 1 a stand 1 has a metal base plate 3 mounted on a hot plate 2 suitably heated to a predetermined temperature to maintain the mounting wax or compound in a semi-liquid state. The base plate 3 carries a column 4 and a support holder 5. The latter has an exchangeable upper part or head 6 held in the support holder 5 by means of a clamping screw 7, and provided with a bore to receive a stub 8 (FIG. 2) of the lens support 9 which is made of brass for good heat conductivity.

The pillar 4 carries a horizontal arm 10 which at its free end supports a hollow lens holder 11 which is vertically movable in the horizontal arm 10 by means of a rack 12 and an operating lever 13 geared thereto. The lens holder 11 is in vertical alignment with the lens support holder 5 mounted on the common base plate 3.

A lens holding socket 14 (FIGS. 1 and 2) has a recess 16 for exchangeably fitting the holding socket 14 by clamping screw 15 to the lower end of the lens holder 11. A bore 17 in the lens holding socket 14 has such a diameter that a lens 18 inserted therein will be held by adhesion at its edge to the walls of the bore without exerting any pressure on the lens.

The lens support 9 is of slightly smaller diameter than the bore 17 so that on lowering the lens holder 11 with the lens holding socket 14 into close proximity with the lens support 9, the latter will not touch the socket 14. The upper surface of lens support 9 is shaped in accordance with the curvature of the lens to be fixed thereto, i.e. either concave or convex.

A suitable supply of compressed air is connected by a pipe or hose 19 to the upper end of the lens holder 11 and can be turned on or off at will by means of a valve (not shown).

To keep a supply of mounting compound and lens supports at the required temperature a storing device 20 of heat conducting material, preferably metal, is also mounted on the hot plate 2. This storing device carries for example, two small vessels 21 containing the heat-softened compound or wax and has a number of holes 22 to receive the stubs of additional lens supports.

By exchanging the lens holding socket 14 and the upper part or head 6 of the support holder 5 the apparatus can be adapted to the mounting of lenses of different diameters on lens supports of varying size.

In operation the lens 18 is placed manually from underneath into the bore 17 of the lens holding socket 14 where it is held by adhesion. The required lens support 9 is slipped into the support holder head 6 and semi-liquid wax from one of the vessels 21 is placed on the upper surface of the lens support 9.

The lens holder 11 is then lowered into close proximity with the support 5 but so that the lens does not touch the wax. Air pressure is then applied to the lens holder 11 through pipe 19 and the lens is thus pressed on to the soft wax by an evenly distributed force which prevents any distortion of the lens. After cooling of the wax the lens is firmly held on the support for the further grinding operation providing the required secondary curves. After renewed softening of the wax the lens can be removed from the support without damage.

Although the invention is particularly advantageous in cases where the secondary curves are ground after the lens has been ground on both sides to the required power, it must be understood that the invention can be applied also in those cases, in which the secondary curves are ground in the first operation as mentioned earlier and the blank, ground on one side only, is to be placed on the support for the finishing operation.

I claim:

1. A method of mounting a corneal lens on a lens support said method consisting of the steps of placing the lens in a lens holder, relatively aligning the lens support and the lens holder, covering the face of the lens support with a mounting compound, bringing the lens support into close proximity with the lens holder, and applying air pressure directly to the surface of the lens on the side opposite to said lens support to blow said lens on to said support.

2. A method of mounting a corneal lens on a lens support according to claim 1 in which the mounting compound is a heat-softened compound and in which the lens support and the compound are cooled after the lens has been blown on to said lens support.

References Cited by the Examiner

UNITED STATES PATENTS

| | | | |
|---|---|---|---|
| 2,509,211 | 5/50 | Clement | 51—277 |
| 2,582,087 | 1/52 | Turner et al. | 51—284 |
| 2,595,760 | 5/52 | Butler | 21—284 |
| 2,838,892 | 6/58 | Blash | 51—277 |

LESTER M. SWINGLE, *Primary Examiner.*

FRANK H. BRONAUGH, J. SPENCER OVERHOLSER, *Examiners.*